(12) United States Patent
Atanassov et al.

(10) Patent No.: US 8,473,842 B2
(45) Date of Patent: Jun. 25, 2013

(54) CONTOUR BASED FLOW LAYOUT

(75) Inventors: Rossen Petkov Atanassov, Bellevue, WA (US); Evgeny N. Veselov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 12/778,717

(22) Filed: May 12, 2010

(65) Prior Publication Data

US 2011/0283184 A1 Nov. 17, 2011

(51) Int. Cl.
*G06F 17/21* (2006.01)
*G06F 17/22* (2006.01)
*G06F 17/23* (2006.01)
*G06F 17/24* (2006.01)

(52) U.S. Cl.
USPC ........... 715/243; 715/244; 715/245; 715/246; 715/247

(58) Field of Classification Search
USPC .................. 715/243, 244, 245, 246, 247, 253
See application file for complete search history.

(56) References Cited

U.S. PATENT DOCUMENTS

| | | | | |
|---|---|---|---|---|
| 5,669,006 | A * | 9/1997 | Joskowicz et al. | 715/202 |
| 6,380,954 | B1 * | 4/2002 | Gunther | 715/764 |
| 7,292,244 | B2 | 11/2007 | Vafiadis et al. | |
| 7,516,400 | B2 | 4/2009 | Ovetchkine et al. | |
| 7,665,018 | B2 | 2/2010 | Honda | |
| 7,684,619 | B2 * | 3/2010 | Sprang et al. | 382/176 |
| 8,091,036 | B1 * | 1/2012 | Pavek et al. | 715/762 |
| 8,127,247 | B2 * | 2/2012 | Tremblay et al. | 715/788 |
| 8,201,109 | B2 * | 6/2012 | Van Os et al. | 715/863 |
| 2004/0268269 | A1 * | 12/2004 | Breinberg | 715/851 |
| 2005/0028099 | A1 * | 2/2005 | Harrington et al. | 715/530 |
| 2006/0031404 | A1 | 2/2006 | Kassab | |
| 2006/0117255 | A1 * | 6/2006 | Seeler | 715/520 |
| 2006/0155699 | A1 * | 7/2006 | Purvis et al. | 707/6 |
| 2006/0179406 | A1 | 8/2006 | Tolpin | |
| 2006/0256198 | A1 * | 11/2006 | Nishiuchi | 348/148 |
| 2006/0257025 | A1 * | 11/2006 | Simmons et al. | 382/186 |
| 2007/0061709 | A1 * | 3/2007 | Marks et al. | 715/517 |
| 2007/0174291 | A1 | 7/2007 | Cooper et al. | |
| 2008/0301547 | A1 * | 12/2008 | Karunakaran et al. | 715/244 |
| 2009/0307583 | A1 * | 12/2009 | Tonisson | 715/246 |
| 2009/0309894 | A1 | 12/2009 | Lam et al. | |
| 2010/0037177 | A1 | 2/2010 | Golsorkhi | |
| 2010/0091310 | A1 * | 4/2010 | Thomas et al. | 358/1.9 |
| 2010/0174975 | A1 * | 7/2010 | Mansfield et al. | 715/227 |
| 2010/0174985 | A1 * | 7/2010 | Levy et al. | 715/244 |
| 2010/0275152 | A1 * | 10/2010 | Atkins et al. | 715/788 |
| 2011/0029860 | A1 * | 2/2011 | Ptucha et al. | 715/246 |
| 2011/0161805 | A1 * | 6/2011 | Slinker | 715/245 |
| 2011/0179351 | A1 * | 7/2011 | Capela et al. | 715/244 |

OTHER PUBLICATIONS

Harrington etal. "Aesthetic Measures for Automated Document Layout", 2004, ACM, pp. 109-111.*

(Continued)

*Primary Examiner* — Doug Hutton, Jr.
*Assistant Examiner* — Soumya Dasgupta
(74) *Attorney, Agent, or Firm* — Wolfe-SBMC

(57) ABSTRACT

Various embodiments introduce the notion of a flow contour that is utilized to conduct layout processing. Flow contours are utilized to organize layout space in the presence of floating objects or geometries. In at least some embodiments, objects can float to the left and/or right in the layout space. Flow contours are abstractions that then represent collections of left-floating and/or right-floating objects.

18 Claims, 13 Drawing Sheets

OTHER PUBLICATIONS

"International Search Report", Mailed Date: Nov. 28, 2011, Application No. PCT/US2011/034221, Filed Date: Apr. 27, 2011, pp. 9.

Sengamedu, et al., "Web Page Layout Optimization Using Section Importance", Retrieved at << http://www2.research.att.com/~rjana/MobEA2008/final/MobEA2008-05.pdf >>, Apr. 21-25, 2008, pp. 8.

Kyrnin, Jennifer., "Fixed Width Layouts Versus Liquid Layouts", Retrieved at << http://webdesign.about.com.od/layout/i/aa060506.htm >>, Retrieved Date: Mar. 8, 2010, pp. 2.

"Controlling Presentation with Measurement and Location Properties in Quirks Mode", Retrieved at << http://msdn.microsoft.com/en-us/library/ms531213(VS.85).aspx >>, Retrieved Date: Mar. 8, 2010, pp. 11.

* cited by examiner

CONTOUR BASED FLOW LAYOUT

BACKGROUND

HTML and CSS (Cascading Style Sheets) layout is an important component for presentation systems that deal with Web content. The nature of modern Web content sets high requirements for layout engines in both functionality and performance respects.

Various existing presentation systems such as Internet browsers, Windows Presentation Foundation (WPF), and various applications address flow content measuring and floating geometry layout, such as that employed in connection with HTML and CSS, in a fully recursive and holistic manner. For example, such systems may layout entire content sub-trees during layout processing.

Flow content describes content that "flows" when it is laid out. For example, lines of text can wrap from line-to-line and/or flow in between different types of geometry, such as floating elements and the like. For example, in a newspaper column layout, an image may appear as a floating element at the top left so that text may flow along the right edge of the image and then proceed underneath the image.

Using fully recursive processes to conduct flow layout can be computationally expensive and inefficient. Additionally, such processes force a non-interruptible, all-or-none approach when higher-level layout algorithms are being designed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments introduce the notion of a flow contour that is utilized to conduct layout processing. Flow contours are utilized to organize layout space in the presence of floating objects. In at least some embodiments, objects can float to the left or right in the layout space. Flow contours are thus abstractions that represent collections of left-floating and/or right-floating objects.

Flow contours can assist various algorithms, such as content measuring algorithms and content insertion algorithms. For example, once flow contours are defined, various content measuring algorithms can be employed to compute content dimensions with respect to the flow contours, such as in shrink-to-fit scenarios. In addition, content insertion algorithms can employ flow contours to ascertain how and where to position various objects, such as static and floating objects.

BRIEF DESCRIPTION OF THE DRAWINGS

The same numbers are used throughout the drawings to reference like features.

DETAILED DESCRIPTION

Overview

Various embodiments introduce the notion of a flow contour that is utilized to conduct layout processing. Flow contours are utilized to organize layout space in the presence of floating objects. In at least some embodiments, objects can float to the left or right in the layout space. Flow contours are thus abstractions that represent collections of left-floating or right-floating objects. In at least some embodiments, flow contours are built in conjunction with a new property associated with floating objects known as "bottom edge". As floating objects are laid out, bottom edge properties are computed for each object. The bottom edge properties facilitate layout by enabling objects to be laid out in an efficient manner. Once the bottom edge properties are computed for the floating objects, flow contours are built.

Flow contours can then be used to assist various algorithms, such as content measuring algorithms and content insertion algorithms. For example, once flow contours are defined, various content measuring algorithms can be employed to compute content dimensions with respect to the flow contours, such as in shrink-to-fit scenarios. In addition, content insertion algorithms can employ flow contours to ascertain how and where to position various objects, such as static and floating objects.

In the discussion that follows, a section entitled "Operating Environment" is provided and describes one environment in which one or more embodiments can be employed. Following this, a section entitled "Flow Contours—In General" describes the notion of a flow contour and how flow contours can be used. Next, a section entitled "Flow Contours—Implementation Example" describes a specific implementation in which flow contours can be computed and used. Last, a section entitled "Example System" describes a system that can be utilized to implement the described embodiments.

Consider now an example operating environment in which one or more embodiments can be implemented.

Operating Environment

Figure 1:
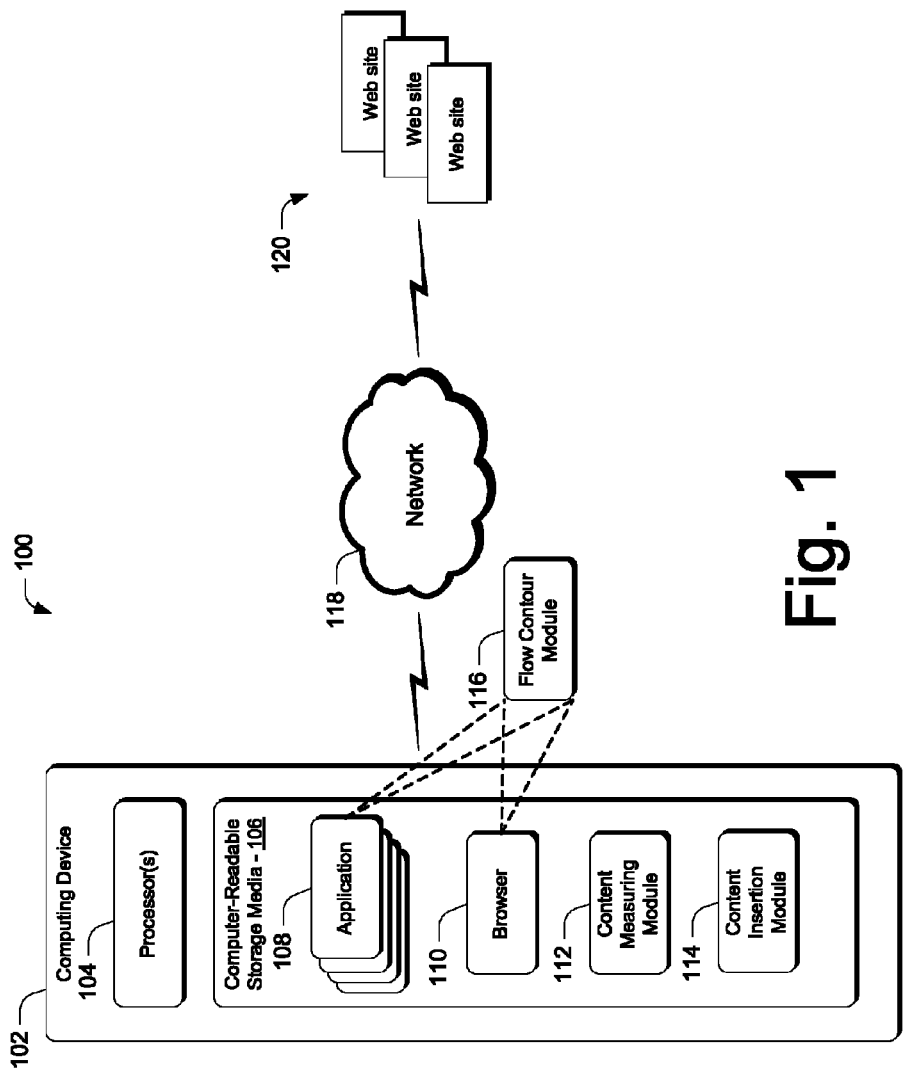
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 13.

In addition, computing device 102 includes a software application in the form of a web browser 110. Any suitable web browser can be used examples of which are available from the assignee of this document and others. In addition, computer-readable storage media 106 can include a content measuring module 112 and a content insertion module 114. Further, computer-readable storage media 106 can also include a flow contour module 116. The flow contour module 116 can comprise a stand-alone component. Alternately or additionally, the flow contour module 116 can be integrated with one or more applications 108 and/or web browser 110.

In operation, the flow contour module 116 is utilized to organize layout space in the presence of floating objects or geometries, as described above and below. The flow contour module 116 can be utilized by content measuring module 112 and/or content insertion module 114 which implement, respectively, one or more content measuring algorithms and one or more content insertion algorithms. For example, once flow contours are defined or computed by flow contour module 116, content measuring module 112 can be employed to compute content dimensions with respect to the flow contours, such as in shrink-to-fit scenarios. In addition, content insertion module 114 can employ flow contours to ascertain how and where to position various objects, such as static and floating objects, as will become apparent below.

In addition, environment 100 includes a network 118, such as the Internet, and one or more web sites 120 from and to which Web content can be received and sent.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of flow contours.

Flow Contours—In General

The notions of layout space and floating object geometry are used in HTML and CSS flow layout. Layout space refers to an object that is used to describe the maximum horizontal and vertical space available, in the direction of a flow, for content insertion during layout. As an example, consider FIG. 2.

There, an example layout space object is designated at 200. The layout space object is typically updated on every insertion and/or change in content nesting levels, i.e., when HTML elements are nested inside one another. A secondary structure that is part of the layout space is utilized in order to represent floating objects. For example, in HTML, elements can have a "float" property. The float property can be computed as "left" or "right." Elements or objects whose float property is set as "left" are left-floating objects that reside on the left of the layout space. Likewise, elements or objects whose float property is set as "right" are right-floating objects that reside on the right of the layout space. The secondary structure is referred to as "geometry." Unlike layout space, the geometry is not updated during non-floating content insertion, but is used to describe the left and right floating objects as a set of obstacles in the layout space.

As an example, layout space 200 includes left-floating objects 202, 204, 206, 208, 210, 212, 214, and 216. In addition, layout space 200 includes right-floating objects 218 and 220.

Once the floating objects are laid out within layout space 200, flow contours can be computed for the left-floating and right-floating objects. Flow contours can be computed in any suitable way, an example of which is described in the section entitled "Flow Contours—Implementation Example" below.

Figure 3:
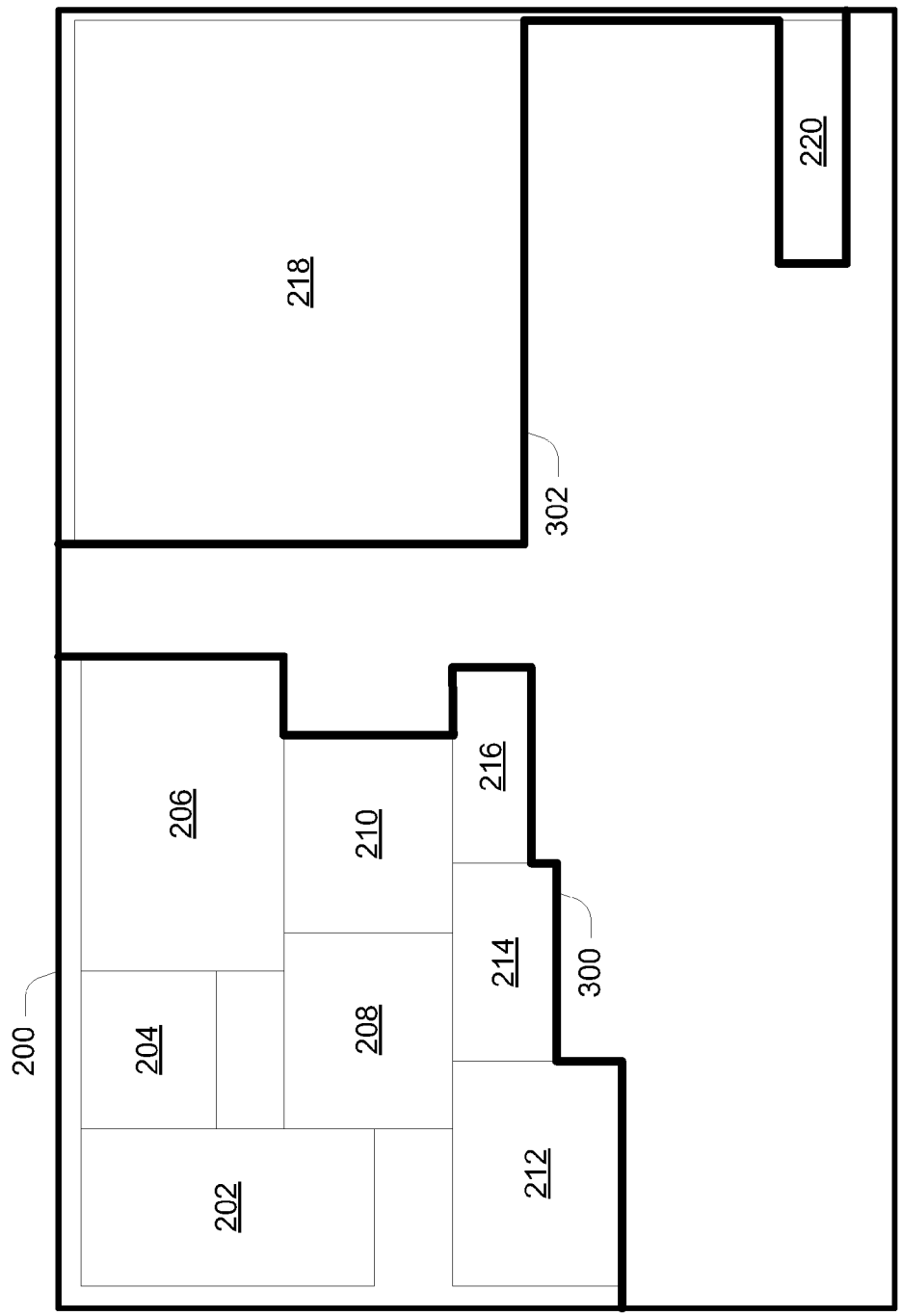
FIG. 3 illustrates example flow contours in accordance with one or more embodiments.

As an example of a flow contour, consider FIG. 3. There, a flow contour 300 has been computed for the collection of left-floating objects, and a flow contour 302 has been computed for the collection of right-floating objects. The flow contours, as computed, describe the outermost contour of the left or right geometry flow.

Figure 4:
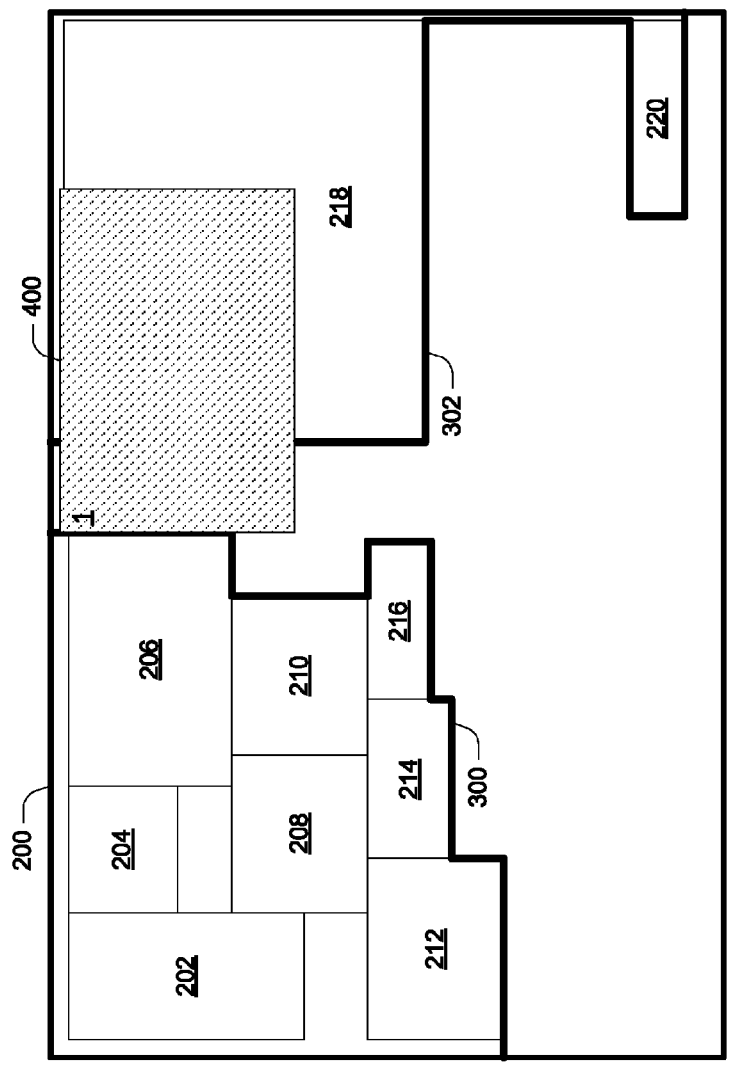
FIGS. 4-7 diagrammatically illustrate content insertion in accordance with one or more embodiments.

Once the flow contours are computed, the flow contours can be used by various content measuring modules and/or content insertion modules for layout processing. As will be appreciated by the skilled artisan, the flow contours abstract the individual floating objects into an outermost contour. Doing so relieves content measuring and content insertion algorithms from having to recursively consider individual floating objects during content layout processing. As an example of a content insertion process using the flow contours of FIG. 3, consider FIG. 4.

Figure 5:
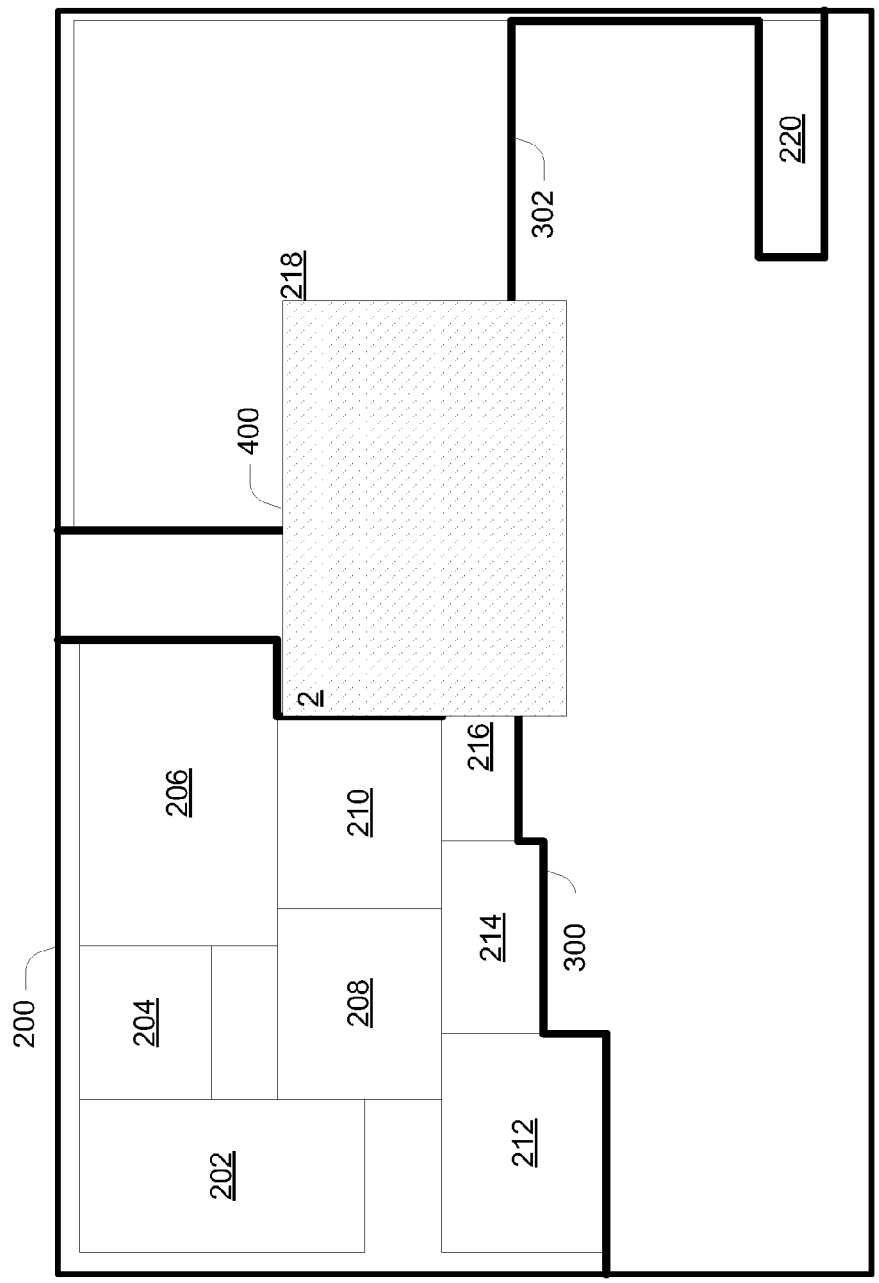

There, content in the form of an object 400 is to be inserted within layout space 200 utilizing flow contours 300 and 302. Object 400 may constitute, for example, an image. Using the flow contours, one wishes to find a location for object 400 in which there is no collision with an underlying floating object. In the illustrated and described example, a first insertion point is selected at the topmost portion of the flow contour as shown. This is designated as position "1." As can be seen, a collision occurs with floating object 218 based on computations using the right flow contour 302. Since there is a collision, a next insertion point is determined. In the illustrated and described example, the next insertion point is attempted at a location in which there is a change in one of the flow contours. So, conceptually, object 400 would be slid down the flow contour until a change of direction occurs. At the location of the direction change, an insertion point is examined to ascertain whether there is a collision with an underlying floating object. As an example, consider FIG. 5.

There, a direction change in the left flow contour 300 has occurred. Correspondingly, at this location (designated position "2"), the insertion point is examined to ascertain whether insertion of object 400 would result in a collision with an underlying floating object. As can be seen, a collision occurs with floating object 218 based on computations using the right flow contour 302. Since there is a collision, a next insertion point is determined.

Figure 6:
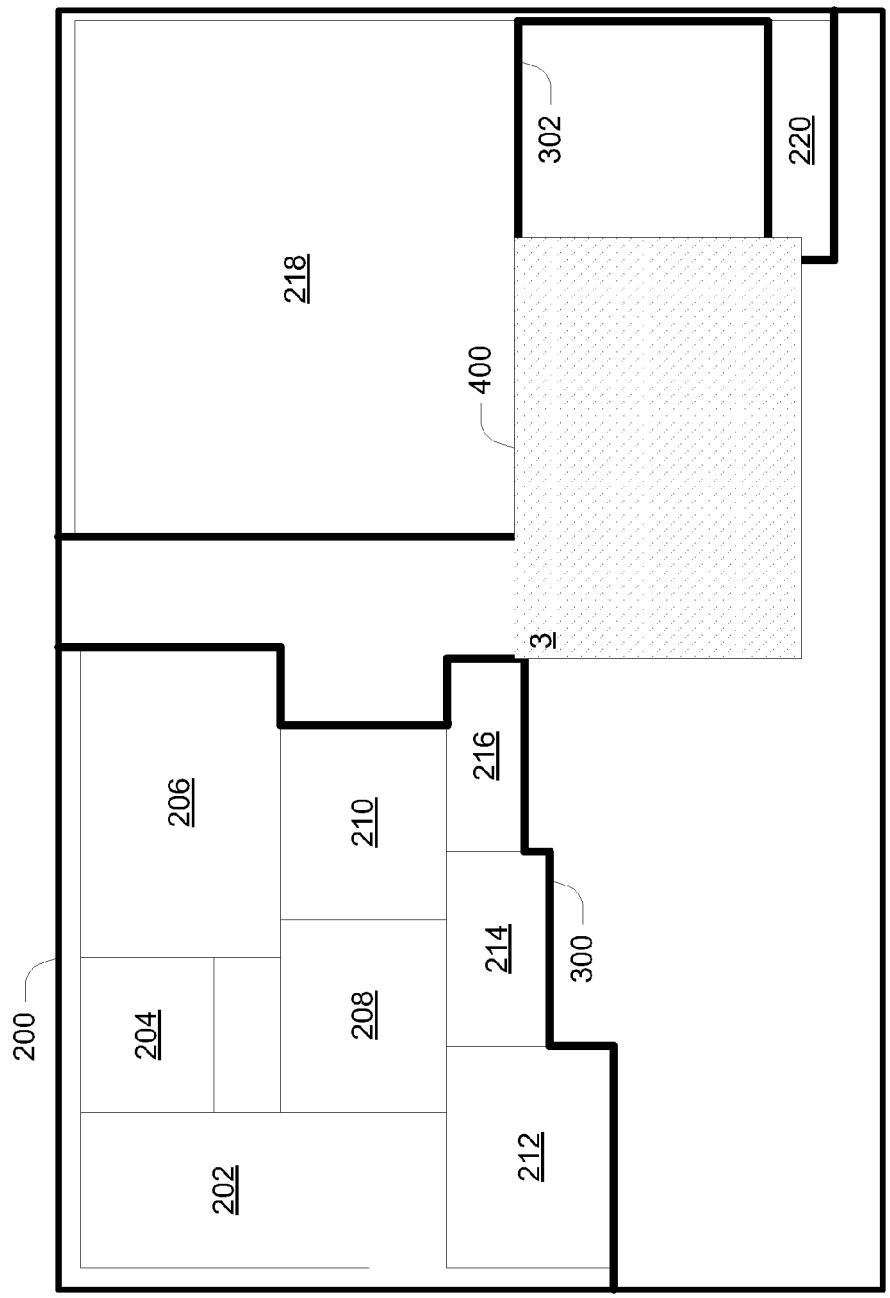

As an example, consider FIG. 6. There, a direction change in the right flow contour of 302 has occurred. Correspondingly, at this location (designated position "3"), an insertion point is examined to ascertain whether insertion of object 400 would result in a collision with an underlying floating object. In this case, a collision occurs with floating object 220. As such, a next insertion point is determined.

Figure 7:
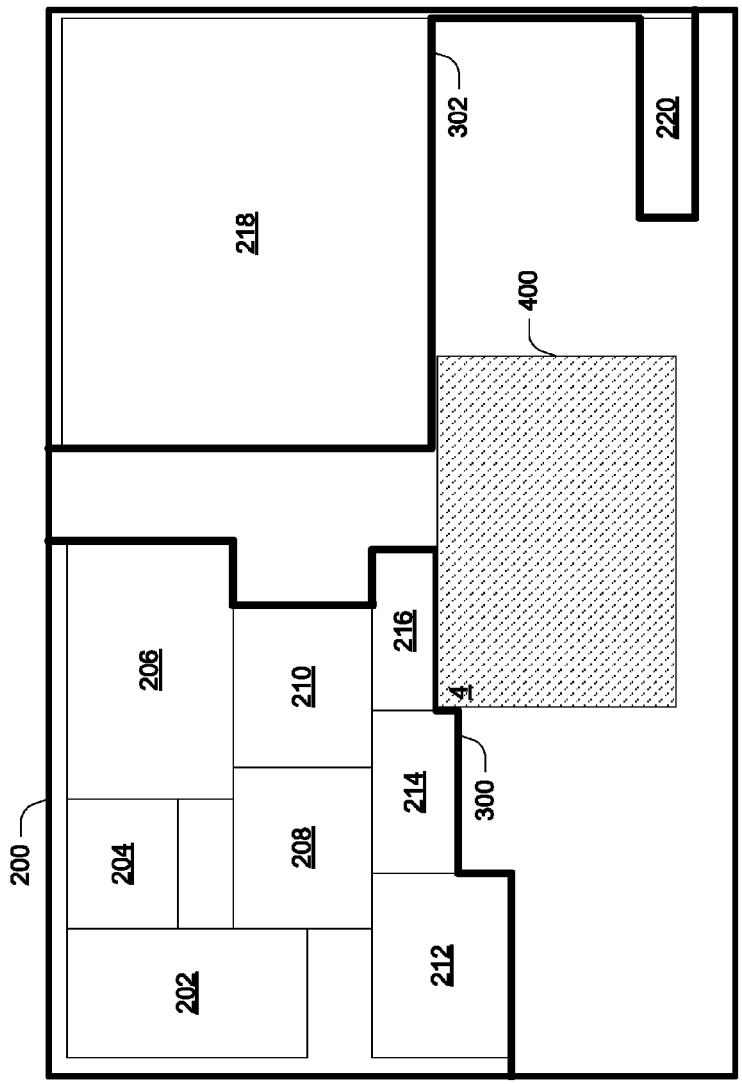

As an example, consider FIG. 7. There, a direction change in flow contour 300 has occurred. Correspondingly, at this location (designated position "4"), an insertion point is examined to ascertain whether insertion of object 400 would result in a collision with an underlying floating object. Since there is no collision with an underlying floating object, object 400 can be placed at the fourth insertion point.

The above example constitutes but one way in which flow contours can be used by content insertion algorithms. It is to be appreciated and understood that any suitable content insertion algorithms can make use of the illustrated and described flow contours without departing from the spirit and scope of the claimed subject matter.

Figure 8:
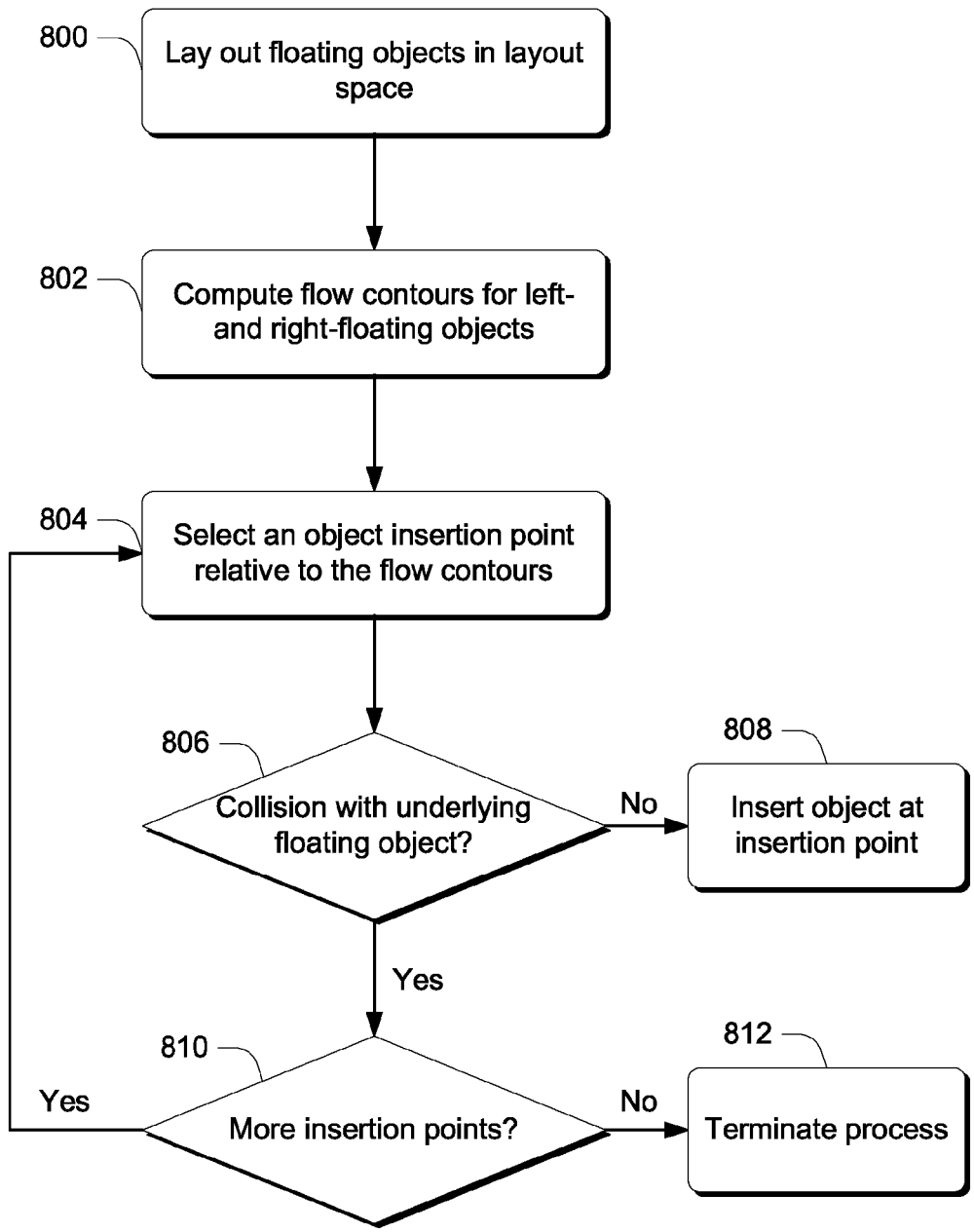
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, aspects of the method can be performed by a flow contour module such as that described above and below.

Other aspects of the method can be performed by a content insertion module such as that described above and below.

Step 800 lays out floating objects in layout space. Any suitable techniques can be used for laying out floating objects in the layout space. One specific example of how layout can be performed is provided below. Step 802 computes flow contours for left- and right-floating objects effective to enable use of the flow contours in layout processing. Any suitable techniques can be utilized to compute flow contours, an example of which is provided below. In addition, any suitable type of layout processing can utilize the flow contours. As an example, step 804 selects, for an associated object, an object insertion point relative to the flow contours. Any suitable initial object insertion point can be utilized, an example of which is provided above. Step 806 ascertains whether the associated object would collide with an underlying floating object. This step can be performed in any suitable way. For example, collisions can be ascertained based on the locations of the flow contours relative to the associated object. For example, an overlap in either the x-direction or y-direction of a flow contour with the associated object would indicate a collision.

If there is no collision, step 808 inserts the associated object at the insertion point. If, on the other hand, there is a collision with a floating object, step 810 ascertains whether there are more insertion points to test. If there are no more insertion points to test, step 812 terminates the process for the associated object. If, on the other hand, there are more insertion points to test, the method returns to step 804 and selects a new object insertion point relative to the flow contours. This process can continue until either the object is inserted in the layout space without colliding with an underlying floating object, or no more insertion points remain to be tested.

Having considered the general notion of flow contours and their use in content measuring and content insertion algorithms, consider a specific implementation example in which flow contours are computed and subsequently used.

Flow Contours—Implementation Example

In this particular example, the notion of a bottom edge property is introduced. The bottom edge property is utilized during layout of floating objects and in conjunction with flow contours.

In the illustrated and described embodiment, each floating object has a bottom edge property that can be designated as either "true" or "false." The bottom edge property is utilized to represent particular floating objects whose bottom edge is lower than or equal to all other preceding floating objects that are part of the same flow, i.e. left flow or right flow. The bottom edge property, if computed as "true" for a floating object, ensures that there can be no collision with any other floating object that is part of the same flow if other content or another floating object were to be inserted below the floating object whose bottom edge property is computed as "true."

Figure 2:
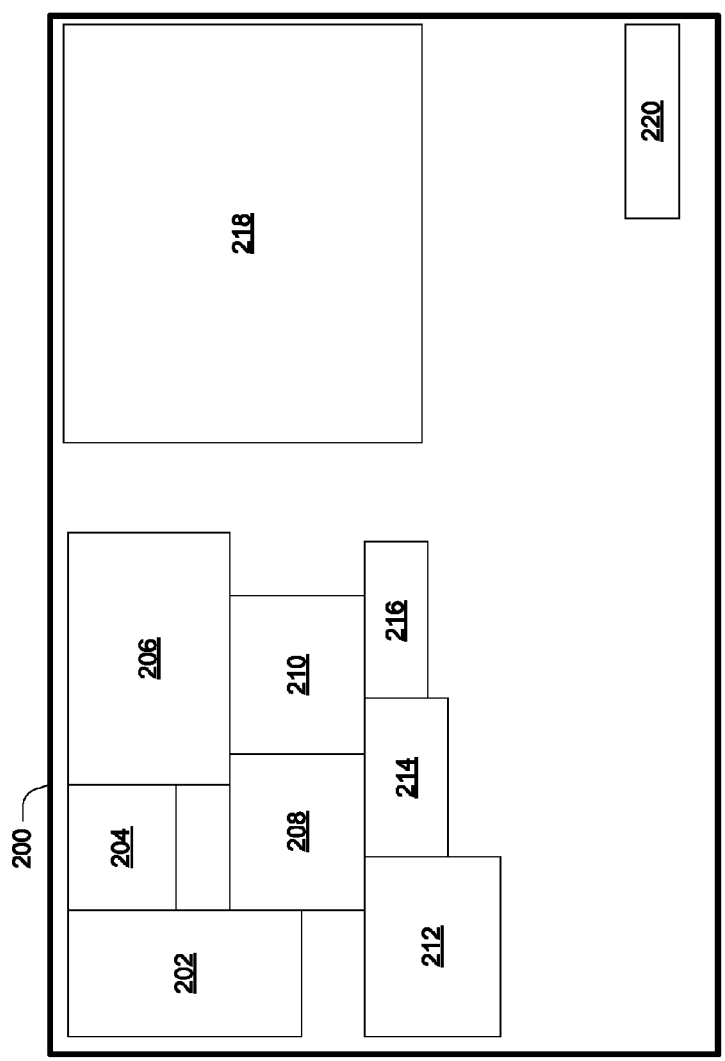
FIG. 2 illustrates an example layout space in accordance with one or more embodiments.
Figure 9:
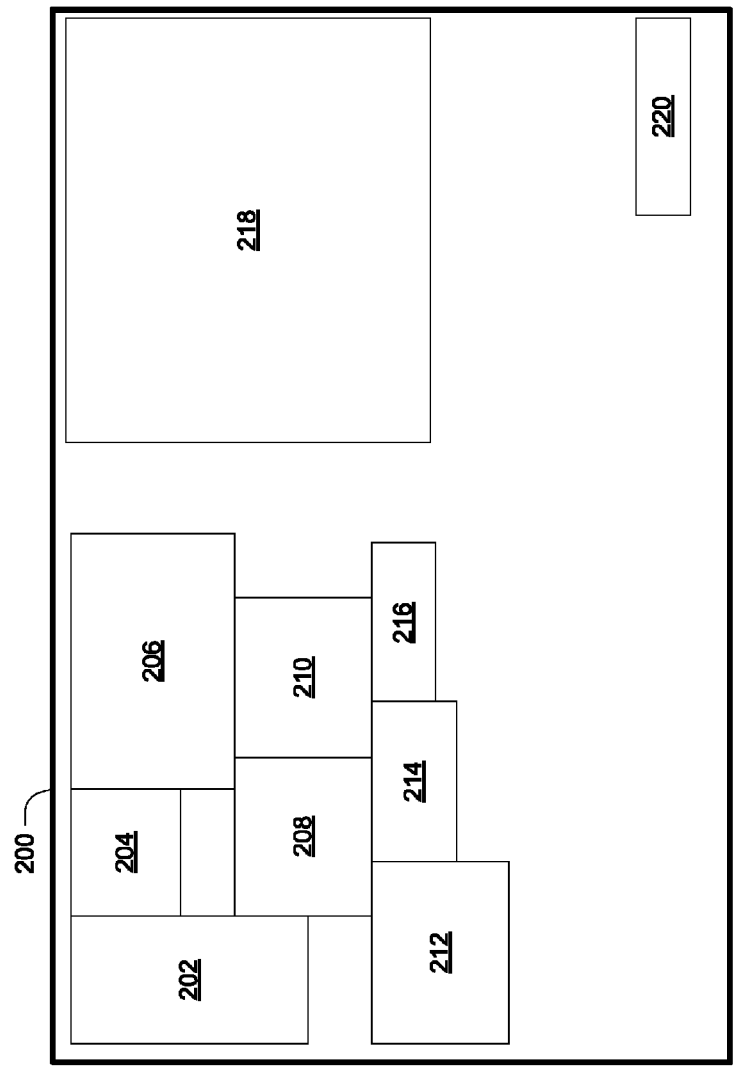
FIG. 9 illustrates an example layout space in accordance with one or more embodiments.

As an example of how the bottom edge property is computed, consider FIG. 9 which utilizes the layout space 200 illustrated in FIG. 2. As floating objects are placed in layout space 200 in time, bottom edge properties for the floating objects are computed. So, for example, for the left-floating objects, the objects are added left-to-right, one after the other. As these objects are added, their bottom edge properties are computed. For the first added floating object 202, there are no preceding floating objects so its bottom edge property is computed as "true." Next in time, floating object 204 is added. Since the preceding floating object 202 has a bottom edge that is lower than the bottom edge of floating object 204, the bottom edge property of floating object 204 is computed as "false." Next, floating object 206 is added and, similarly, its bottom edge property is computed as "false."

Next, floating object 218 is added and, since there are no preceding right-floating objects, its bottom edge property is set as "true." Next, floating object 208 is added and, since it is a left-floating object that cannot be added to the right of floating object 206 without colliding with floating object 218, floating object 208 is moved to the next level and moved to the left until it runs into floating object 202. When it is positioned as such, its bottom edge property is computed as "true" because there are no preceding floating objects that have bottom edges lower than its bottom edge. Following similar logic, floating objects 210, 212, 214, 216, and 220 are added to the layout space. The bottom edge properties of these floating objects are as follows: floating object 210 (true), floating object 212 (true), floating object 214 (false), floating object 216 (false), and floating object 220 (true).

Figure 10:
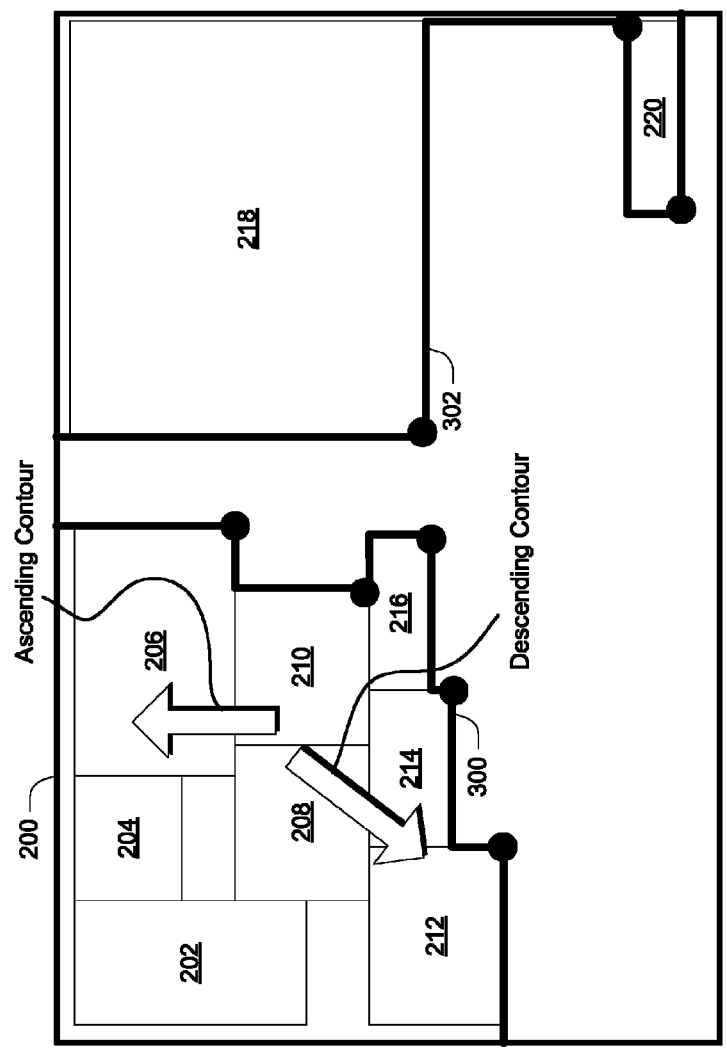
FIG. 10 illustrates example flow contours in accordance with one or more embodiments.

Once all of the floating objects have been laid out, flow contours can be computed, in this embodiment, by considering the bottom edge properties of the floating objects during traversal of the floating objects. As an example, consider FIG. 10. In this example, a flow contour is a data structure that includes a list of sorted points, graphically illustrated by the black dots in FIG. 10. Computation of this list of sorted points is achieved by walking one of two secondary ordered lists referred to as ascending and descending contour. The bottom edge property can be used in order to save potentially long "walks" over floater object lists. The secondary lists are computed during floating object insertion. Each point in the list is associated with properties that include the previous ascending floating object and the previous descending floating object. The point itself represents the location where the flow contour changes, i.e. makes a turn.

Once the flow contours have been built or constructed, they can be utilized by various content measuring and/or content insertion algorithms.

As an example, consider the following. Content measuring is a notion that is utilized in CSS. Content measuring is a flow layout algorithm that is used to measure the minimum and maximum widths of static and floating elements in a web document. The content measure of particular elements is utilized for such things as computing shrink-to-fit sizes of elements such as tables, floaters, inline blocks or absolutely positioned elements. Take, for example, a line of text. The maximum size of the line of text, assuming no explicit line breaks, would be the entire sentence. The minimum size would be the line's longest word size to guarantee that all of the words would adequately fit within the defined space. Shrink-to-fit computations simply use these minimum and maximum sizes as part of the content layout process.

However, as will be appreciated by the skilled artisan, computing this content measure by itself is a non-trivial task because one assumes an infinite amount of space during layout processing. That is, in computing content measure, one assumes that there might be long paragraphs of text where no explicit line breaks occur. In all of this infinite space, floating objects are arranged and associated flow contours are utilized to compute the measure of static content such as text lines. The flow contours are utilized as a way to conceptually define thicknesses on either side of this infinite space. Once all of the floating objects have been laid out, content measures associated with content that is to reside between the left-floating and right-floating objects are computed.

Figure 11:
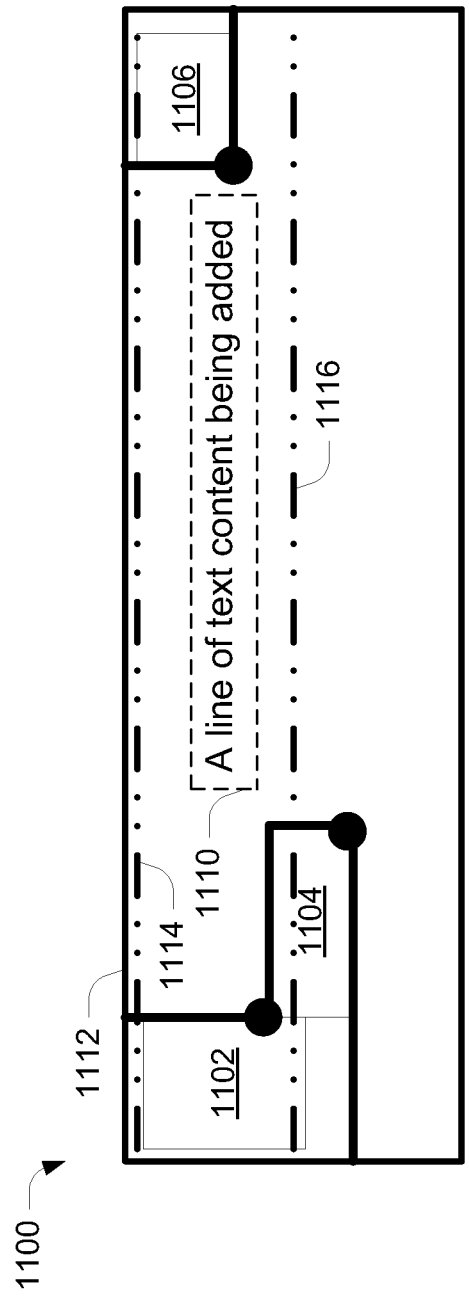
FIG. 11 illustrates example flow contours in accordance with one or more embodiments.

As an example, consider FIG. 11 which illustrates a system generally at 1100 in which a line of text is to be inserted between floating objects. In this example there is a space that one can assume is infinitely wide and infinitely tall. In this instance, floating objects 1102, 1104, and 1106 have been added within layout space 1112. The line of text is to be inserted between two flow contours that are defined, respectively, by the left- and right-floating objects. The line of text has a particular vertical position where it will start and end, and a particular size which is represented by the dashed rectangle 1110. At this point, if this is the only content that is to be added, the maximum size is computed. The way that the flow contours are utilized in this process is as follows. The new line of text will contribute to the content width of the container element by its maximum size plus the sum of the left and right geometries or floating objects. The width of the two geometries is computed based on flow contour offsets from the boundary of the layout space 1112. The range of the flow contour is determined by the top and bottom most points of the newly inserted content, here represented by lines 1114 and 1116. Using this information, the content size of the line of text as applicable to its container can be computed and the text can be inserted in the layout space without colliding with the floating objects.

With respect to content insertion, content insertion algorithms for static block formatting context and floating objects can also make use of flow contours as noted above in FIGS. 4-7 and the related discussion. These algorithms can utilize multiple formatting attempts in order to find the first available, e.g., highest-most in the direction of the current flow, position for an object. The flow contours enable these algorithms to be implemented as a sequential process trying one contour point at a time until the new object fits between the left and right flow contours without a collision.

In addition, content insertion algorithms that insert floating objects into a layout space can utilize flow contours as well. After computation of the flow contours, the algorithm can iterate over each available position along the left or right contour until a desirable width of the new floating object is satisfied. Once a position is found and the floating object is inserted into the ascending and descending contour, links or pointers are computed that connect the chain of floating objects to form a geometry.

Figure 12:
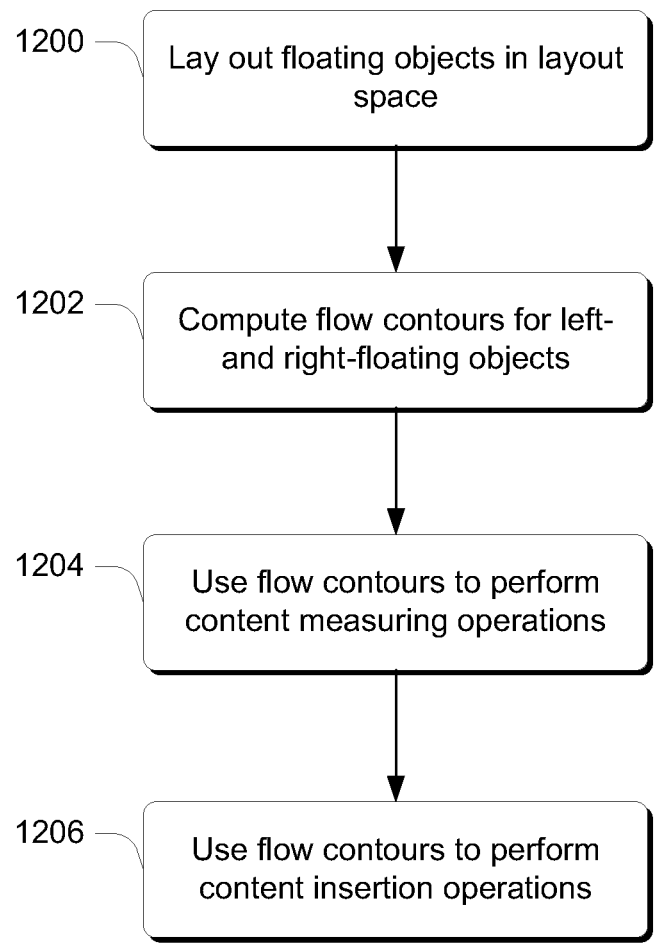
FIG. 12 is a flow diagram that describes steps in a method in accordance with one or more embodiments.

FIG. 12 is a flow diagram that describes steps in a method in accordance with one or more embodiments. The method can be performed in connection with any suitable hardware, software, firmware, or combination thereof. In at least some embodiments, aspects of the method can be performed by a flow contour module such as that described above and below. Other aspects of the method can be performed by a content insertion module such as that described above and below. Yet other aspects can be performed by a content measuring module such as that described above.

Step 1200 lays out floating objects in layout space. Any suitable techniques can be used for laying out floating objects in the layout space. For example, in at least some embodiments, laying out the floating objects can include computing bottom edge properties for individual floating objects as described above. Step 1202 computes flow contours for left- and right-floating objects. Any suitable techniques can be utilized to compute flow contours, an example of which is provided above. Step 1204 uses the flow contours to perform content measuring operations. Examples of how this can be done are provided above. Step 1206 uses the flow contours to perform content insertion operations. Examples of how this can be done are provided above.

Example System

Figure 13:
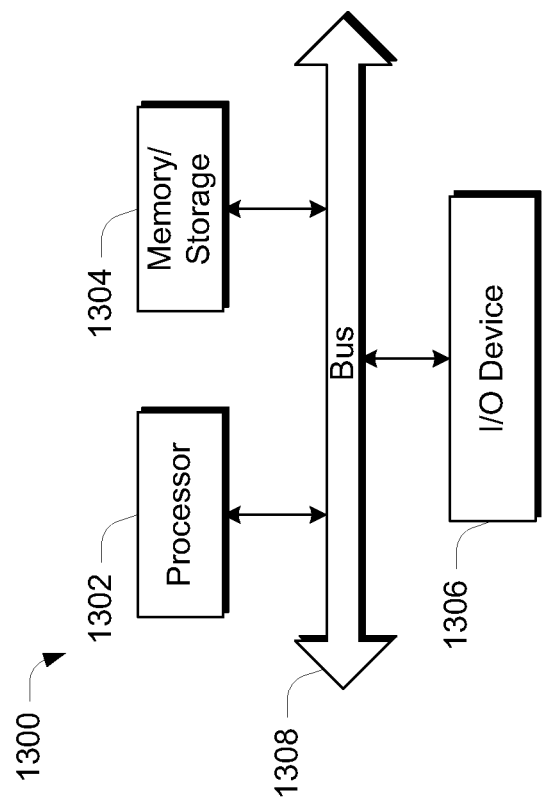
FIG. 13 illustrates an example system that can be utilized to implement one or more embodiments.

FIG. 13 illustrates an example computing device 1300 that can be used to implement the various embodiments described above. Computing device 1300 can be, for example, computing device 102 of FIG. 1 or any other suitable computing device.

Computing device 1300 includes one or more processors or processing units 1302, one or more memory and/or storage components 1304, one or more input/output (I/O) devices 1306, and a bus 1308 that allows the various components and devices to communicate with one another. Bus 1308 represents one or more of any of several types of bus structures, including a memory bus or memory controller, a peripheral bus, an accelerated graphics port, and a processor or local bus using any of a variety of bus architectures. Bus 1308 can include wired and/or wireless buses.

Memory/storage component 1304 represents one or more computer storage media. Component 1304 can include volatile media (such as random access memory (RAM)) and/or nonvolatile media (such as read only memory (ROM), Flash memory, optical disks, magnetic disks, and so forth). Component 1304 can include fixed media (e.g., RAM, ROM, a fixed hard drive, etc.) as well as removable media (e.g., a Flash memory drive, a removable hard drive, an optical disk, and so forth).

One or more input/output devices 1306 allow a user to enter commands and information to computing device 1300, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments introduce the notion of a flow contour that is utilized to conduct layout processing. Flow contours are utilized to organize layout space in the presence of floating objects or geometries. In at least some embodiments, objects can float to the left or right in the layout space. Flow contours thus are abstractions that represent collections of left-floating and/or right-floating objects.

Flow contours can assist various algorithms, such as content measuring algorithms and content insertion algorithms. For example, once flow contours are defined, various content measuring algorithms can be employed to compute content dimensions with respect to the flow contours, such as in shrink-to-fit scenarios. In addition, content insertion algorithms can employ flow contours to ascertain how and where to position various objects, such as static and floating objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    laying out one or more floating objects in a layout space, each floating object of the one or more floating objects having an updatable bottom edge state property configured to indicate whether a bottom edge associated with the each floating object is lower than or equal to all other bottom edges associated with preceding floating objects in an associated flow,
    wherein the laying out comprises evaluating each individual floating object of the plurality of objects as it is laid out effective to compute a state of the updatable bottom edge state of said individual floating object and evaluating each preceding floating object effective to compute a state of each associated updatable bottom edge state;
    computing one or more flow contours associated with the one or more floating objects; and
    enabling use of the one or more flow contours in layout processing of content in the layout space.

2. The method of claim 1, wherein said laying out further comprises laying out left-floating and right-floating objects.

3. The method of claim 1, wherein said enabling comprises enabling use of the one or more flow contours in content measuring associated with content that is to be inserted in the layout space.

4. The method of claim 1, wherein said enabling comprises enabling use of the one or more flow contours in content insertion associated with content that is to be inserted in the layout space.

5. The method of claim 1, wherein said enabling comprises:
    enabling use of the one or more flow contours in content measuring associated with content that is to be inserted in the layout space; and
    enabling use of the one or more flow contours in content insertion associated with content that is to be inserted in the layout space.

6. The method of claim 1, wherein said enabling comprises enabling use of the one or more flow contours to position static and floating objects.

7. Computer-readable storage memory comprising computer-readable instructions which, responsive to execution by at least one processor, are configured to:
    lay out one or more floating objects in a layout space, each floating object of the one or more floating objects having an updatable bottom edge state property configured to indicate whether a bottom edge associated with the each floating object is lower than or equal to all other bottom edges associated with preceding floating objects in an associated flow, wherein to lay out one or more floating objects comprises evaluating each individual floating object of the plurality of objects as it is laid out effective to compute a state of the updatable bottom edge state of said individual floating object and evaluating each preceding floating object effective to compute a state of each associated updatable bottom edge state;
    compute one or more flow contours associated with the one or more floating objects; and
    enable use of the one or more flow contours in layout processing of content in the layout space.

8. The computer-readable storage memory of claim 7, wherein to lay out one or more floating objects further comprises laying out left-floating and right-floating objects.

9. The computer-readable storage memory of claim 7, wherein to enable use of the one or more flow contours in layout processing of content further comprises enabling use of the one or more flow contours in content measuring associated with content that is to be inserted in the layout space.

10. The computer-readable storage memory of claim 7, wherein to enable use of the one or more flow contours in layout processing of content further comprises enabling use of the one or more flow contours in content insertion associated with content that is to be inserted in the layout space.

11. The computer-readable storage memory of claim 7, wherein to enable use of the one or more flow contours in layout processing of content further comprises:
    enabling use of the one or more flow contours in content measuring associated with content that is to be inserted in the layout space; and
    enabling use of the one or more flow contours in content insertion associated with content that is to be inserted in the layout space.

12. The computer-readable storage memory of claim 7, wherein to enable use of the one or more flow contours in layout processing of content further comprises enabling use of the one or more flow contours to position static and floating objects.

13. A system comprising:
    at least one processor; and
    computer-readable storage memory comprising computer-readable instructions which, responsive to execution by at least one processor, are configured to:
        lay out one or more floating objects in a layout space, each floating object of the one or more floating objects having an updatable bottom edge state property configured to indicate whether a bottom edge associated with the each floating object is lower than or equal to all other bottom edges associated with preceding floating objects in an associated flow,
        wherein to lay out one or more floating objects comprises evaluating each individual floating object of the plurality of objects as it is laid out effective to compute a state of the updatable bottom edge state of said individual floating object and evaluating each preceding floating object effective to compute a state of each associated updatable bottom edge state;
        compute one or more flow contours associated with the one or more floating objects; and
        enable use of the one or more flow contours in layout processing of content in the layout space.

14. The system of claim 13, wherein to lay out one or more floating objects further comprises laying out left-floating and right-floating objects.

15. The system of claim 13, wherein to enable use of the one or more flow contours in layout processing of content further comprises enabling use of the one or more flow contours in content measuring associated with content that is to be inserted in the layout space.

16. The system of claim 13, wherein to enable use of the one or more flow contours in layout processing of content further comprises enabling use of the one or more flow contours in content insertion associated with content that is to be inserted in the layout space.

17. The system of claim 13, wherein to enable use of the one or more flow contours in layout processing of content further comprises:
- enabling use of the one or more flow contours in content measuring associated with content that is to be inserted in the layout space; and
- enabling use of the one or more flow contours in content insertion associated with content that is to be inserted in the layout space.

18. The system of claim 13, wherein to enable use of the one or more flow contours in layout processing of content further comprises enabling use of the one or more flow contours to position static and floating objects.

* * * * *